(12) United States Patent
Lee

(10) Patent No.: US 9,086,772 B2
(45) Date of Patent: Jul. 21, 2015

(54) TOUCH PANEL

(71) Applicant: HengHao Technology Co. LTD, Taoyuan County (TW)

(72) Inventor: Chien-Yi Lee, Taoyuan County (TW)

(73) Assignee: HengHao Technology Co. Ltd., Taoyuan County (TW)

( * ) Notice: Subject to any disclaimer, the term of this patent is extended or adjusted under 35 U.S.C. 154(b) by 7 days.

(21) Appl. No.: 14/084,300

(22) Filed: Nov. 19, 2013

(65) Prior Publication Data

US 2015/0077649 A1 Mar. 19, 2015

(30) Foreign Application Priority Data

Sep. 13, 2013 (TW) .............................. 102133294 A

(51) Int. Cl.
*G06F 3/044* (2006.01)
(52) U.S. Cl.
CPC ...... *G06F 3/044* (2013.01); *G06F 2203/04107* (2013.01)
(58) Field of Classification Search
CPC ............ G06F 2203/04107; G06F 3/041–3/047
USPC ...................... 345/173–178; 178/18.01–20.04
See application file for complete search history.

(56) References Cited

U.S. PATENT DOCUMENTS

| | | | |
|---|---|---|---|
| 2005/0078232 A1* | 4/2005 | Lo et al. ........................... | 349/40 |
| 2005/0237439 A1* | 10/2005 | Mai ................................ | 349/12 |
| 2006/0203403 A1* | 9/2006 | Schediwy et al. .............. | 361/56 |
| 2007/0046550 A1* | 3/2007 | Park et al. ...................... | 343/702 |
| 2007/0222766 A1* | 9/2007 | Bolender ....................... | 345/173 |
| 2009/0262094 A1* | 10/2009 | Lin ................................ | 345/174 |
| 2010/0002346 A1* | 1/2010 | Shih et al. ....................... | 361/56 |
| 2010/0182275 A1* | 7/2010 | Saitou ........................... | 345/174 |
| 2011/0050625 A1* | 3/2011 | Kim et al. ..................... | 345/174 |
| 2011/0057887 A1* | 3/2011 | Lin et al. ....................... | 345/173 |
| 2011/0090159 A1* | 4/2011 | Kurashima .................... | 345/173 |
| 2011/0157084 A1* | 6/2011 | Huang et al. .................. | 345/174 |
| 2012/0075218 A1* | 3/2012 | Lin et al. ....................... | 345/173 |
| 2012/0120011 A1* | 5/2012 | Teng et al. .................... | 345/173 |
| 2013/0154979 A1* | 6/2013 | Li et al. ......................... | 345/173 |
| 2014/0028582 A1* | 1/2014 | Choi .............................. | 345/173 |
| 2014/0085261 A1* | 3/2014 | Lu et al. ........................ | 345/174 |
| 2014/0198060 A1* | 7/2014 | Wu et al. ....................... | 345/173 |

FOREIGN PATENT DOCUMENTS

TW 201502893 A 1/2015

OTHER PUBLICATIONS

Office Action Dated Mar. 5, 2015 in corresponding Taiwan Patent Application No. 102133294.

* cited by examiner

*Primary Examiner* — Dmitriy Bolotin
(74) *Attorney, Agent, or Firm* — Donald E. Stout; Stout, Uxa & Buyan, LLP

(57) ABSTRACT

A touch panel includes a transparent substrate, electrodes, traces and at least two ground rings on the transparent substrate. The traces connect the electrodes to transmit signals. At least two ground rings connect to each other through a plurality of bridges and surround the electrodes and the traces. Each bridge has at least one ESD tip or peak to enhance local electric field strength and electrostatic discharge.

6 Claims, 2 Drawing Sheets

1

TOUCH PANEL

BACKGROUND OF THE INVENTION

1. Field of the Invention

The present invention generally relates to a touch panel, and more particularly to a touch panel with a multiple-ground ring design.

2. Description of the Related Art

Touch panels can be categorized as resistive type, capacitive type and optical type touch panels according to different sensing technologies. Due to advantages of the capacitive type touch panel, including quick response time, high reliability and durability, capacitive type touch panels have become the most widely used touch panel. Capacitive touch panels uses capacitive coupling effects to detect touch location. When conductive pointers such as user finger(s) approach or touch the surface of the capacitive type touch panel, capacitance(s) corresponding to the touch location(s) will be altered and thus the touch location(s) is able to be detected.

A typical capacitive type touch panel has electrodes and circuit traces formed by transparent conductive materials on a glass substrate. The circuit traces usually suffer damages resulting from electrostatic discharge (ESD) during manufacturing process or due to other causes. Capacitive type touch panels thus must have electrostatic discharge protection designs in order to avoid the damages caused by electrostatic discharge.

FIG. 1 shows a top view of a capacitive type touch panel. The capacitive type touch panel comprises a touch control area with electrodes and a grounding ring 12 surrounding the touch control area. The electrodes are connected in series along two directions perpendicular to each other to form an electrode matrix. The electrode matrix comprises a plurality of first electrodes 14 and traces 18 in one direction and a plurality of second electrodes 16, traces 19 and bridges 17 in another direction. Each bridge 17 electrically connects two adjacent second electrodes 16. The ground ring 12 surrounds the first and the second electrodes 14 and 16, the traces 18 and 19 and a junction area 11 to achieve electrostatic discharge protection.

Although the electrostatic discharge protection design set forth can provide certain electrostatic discharge protection capability, there s still a risk of rampant electrostatic charges cross the protection since the electrostatic discharge protection design set forth only deploys one ground ring on the peripheral region of the electrodes and traces. The electrostatic discharge current could jump into the traces adjacent the ground ring and cause damages of the traces or the electrodes.

Therefore, there is a need to provide an innovative touch panel to improve the shortcomings of the traditional touch panel.

SUMMARY OF THE INVENTION

One object of the invention is to provide a touch panel with a multiple-ground ring design to increase electrostatic discharge protection capability of the touch panel In one embodiment of the invention, the invention provides a touch panel comprising a transparent substrate, a plurality of electrodes and traces on the transparent substrate and at least two ground rings on the transparent substrate surrounding the electrodes and the traces. The traces connect the electrodes to transmit signals. A plurality of bridges connect the ground rings. The bridge comprises at least one electrostatic discharge tip to increase a local electric field strength and to initiate electrostatic discharging.

DETAILED DESCRIPTION

Embodiment of this invention will be described in detail below. However, in addition to as described below, and this invention can be broadly implemented in the other cases the purpose and scope of this invention is not affected by the application of qualified, claim after its prevail. Furthermore, to provide a description more clear and easier to understand the invention, the pieces within the schema and not in accordance with their relative size of drawing, compared to certain dimensions to other scales have been exaggerated; details not related nor completely drawn in part in order to schematic simplicity.

Figure 1:
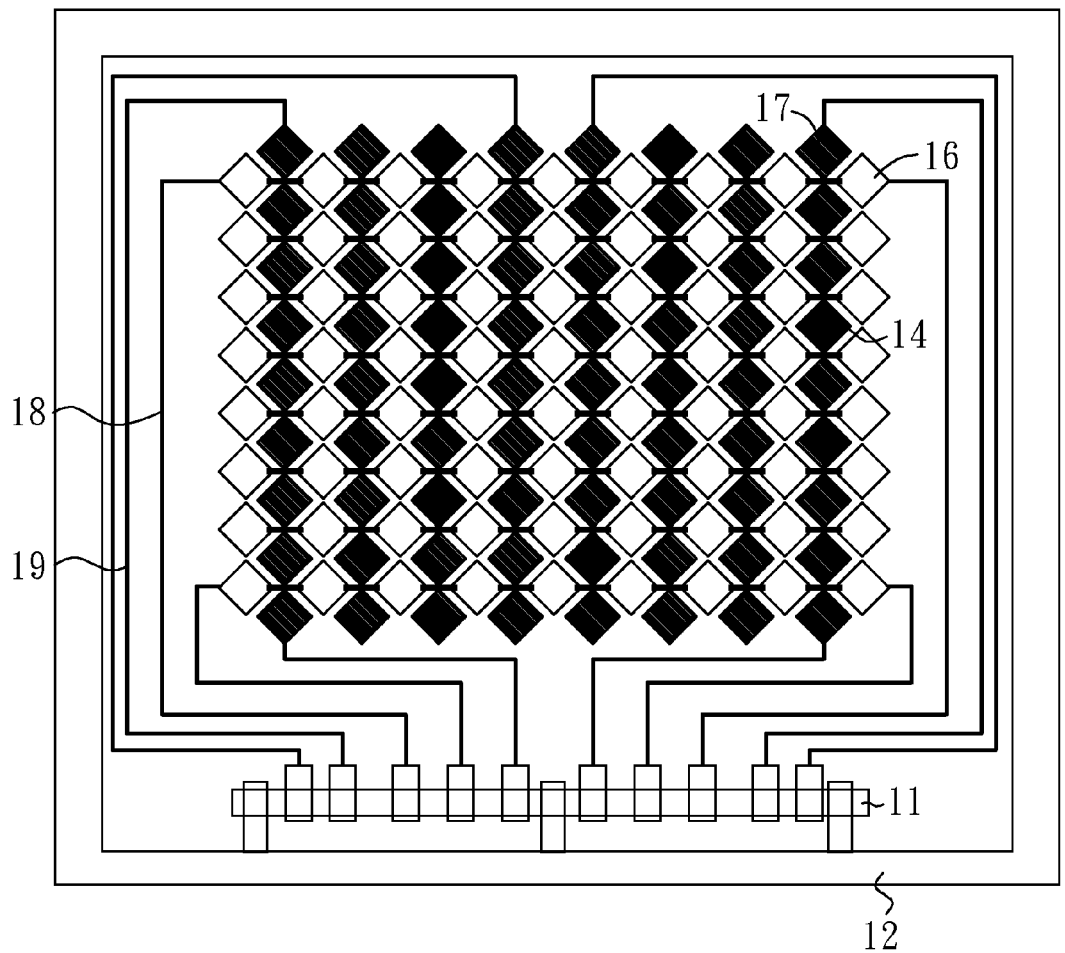
FIG. 1 shows a top view of a capacitive type touch panel.
Figure 2:
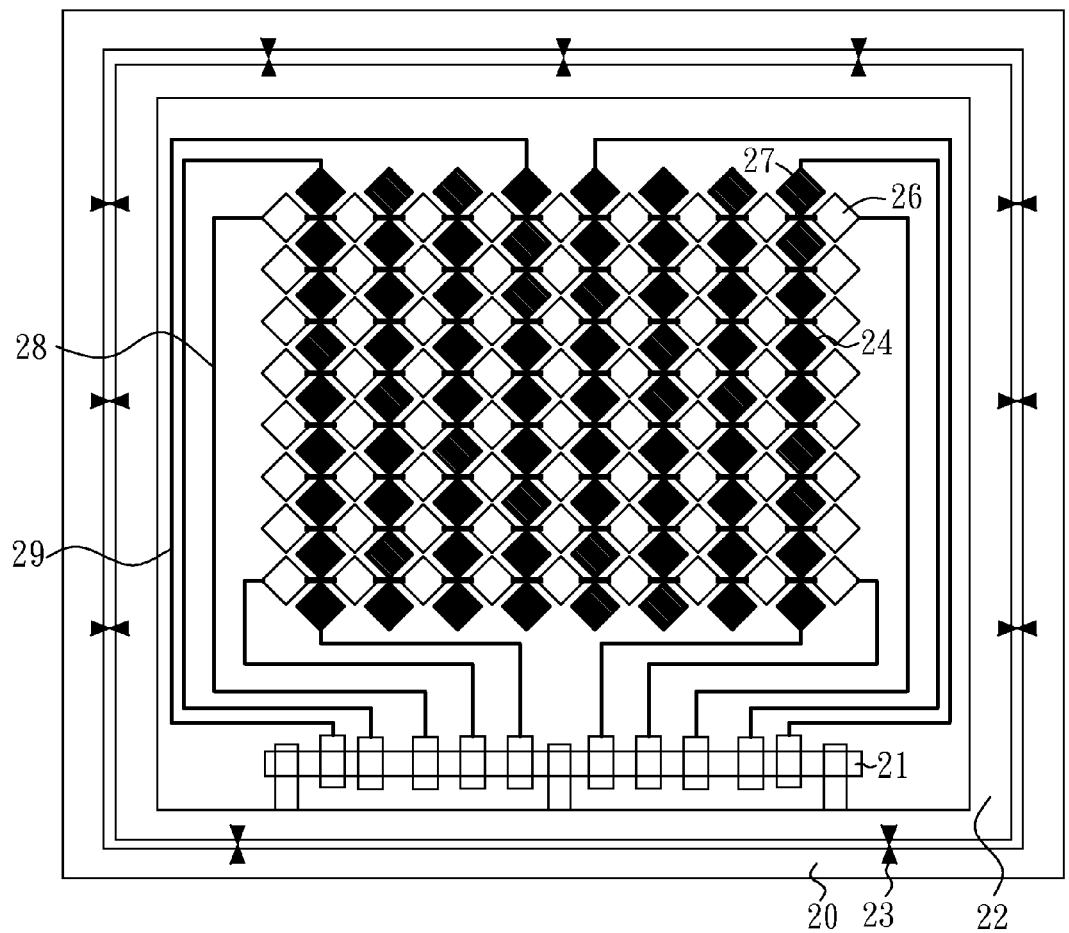
FIG. 2 shows a top view of a touch panel according to one embodiment of the invention.

FIG. 2 shows a top view of a touch panel according to one embodiment of the invention. The touch panel of this embodiment comprises, but is not limited to, one glass substrate/solution (OGS) or one film substrate/solution (OFS) touch panel.

As shown in FIG. 2, a capacitive type touch panel can comprise a transparent substrate having a touch control area with electrodes, and a first grounding ring 20 and a second ground ring 22 connecting with each other surrounding the touch control area. The transparent substrate further comprises traces 28 and 29 connecting to first electrodes 24 and second electrodes 26 thereon to transmit signals via a junction area 21. The first and second electrodes 24 and 26 are connected in series along two directions perpendicular to each other to form an electrode matrix. The electrode matrix comprises a plurality of the first electrodes 24 in one direction and a plurality of second electrodes 26 and bridges 27 in another direction. Each bridge 27 electrically connects two adjacent second electrodes 26. The first and second electrodes 24 and 26 can be receive electrodes (Rx) and transmit electrodes (Tx).

The first and second ground rings 20 and 22 surround the first and the second electrodes 24 and 26, and the traces 28 and 29 to block external electrostatic discharge. A plurality of bridges 23 exist between the first and second ground rings 20 and 22 in order to initiate electrostatic discharge toward the atmosphere environment and to deplete electrostatic charges so as to provide electrostatic discharge protection.

The bridges 23 between the first and second ground rings 20 and 22 are used to provide electrostatic discharging. The shape of the bridge 23 can be any geometric shape which can increase regional or local electric field strength, such as a geometric shape with a gradually decreasing width. The shape of the bridge 23 comprises, but is not limited to, a dual triangle shape with two connecting tips to increase or enhance regional or local electric field strength as shown in FIG. 2. Moreover, the shapes and number of the first and second ground rings 20 and 22 are also examples only, not limitations. More than two ground rings surrounding electrodes and traces can also be utilized.

The electrodes comprise a structure of conductive materials. The conductive material comprises indium tin oxide (ITO), indium zinc oxide (IZO), Al-doped ZnO (AZO) or antimony tin oxide (ATO), nano-silver or nano-copper, etc.

The grounding rings comprise, but are not limited to, conductive materials including indium tin oxide, indium zinc oxide, aluminum zinc oxide, or antimony tin oxide. The grounding rings can be formed, for example, without limitation, on the peripheral area of the touch panel surrounding the electrodes of the touch panel.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A touch panel, comprising:
   a transparent substrate;
   a plurality of electrodes and traces on the transparent substrate, the traces connecting the electrodes to transmit signals; and
   a first ground ring and a second ground ring on the transparent substrate and surrounding the electrodes and the traces, a plurality of bridges connecting the first and the second ground rings, the bridge comprising at least one electrostatic discharge tip to enhance a local electric field strength and to initiate electrostatic discharging, wherein the first ground ring and the second ground ring are separated by a space of atmosphere so that the bridges across the space of atmosphere initiate electrostatic discharging toward atmosphere environment.

2. The touch panel of claim 1, wherein a shape of the bridge comprises a dual triangles with two connecting tips.

3. The touch panel of claim 1, wherein the electrode comprises a structure of conductive material, the conductive material comprises indium tin oxide (ITO), indium zinc oxide (IZO), Al-doped ZnO (AZO) or antimony tin oxide (ATO), nano-silver or nano-copper.

4. The touch panel of claim 1, wherein the grounding ring comprises indium tin oxide, indium zinc oxide, aluminum zinc oxide, or antimony tin oxide.

5. The touch panel of claim 1, wherein a shape of the bridge comprises a geometric shape which can increase the local electric field strength.

6. The touch panel of claim 1, wherein the touch panel comprises a one glass substrate touch panel or a one film substrate touch panel.

* * * * *